United States Patent
Li et al.

(10) Patent No.: US 10,098,285 B2
(45) Date of Patent: Oct. 16, 2018

(54) GARDENING TOOL AND HEDGE TRIMMER

(71) Applicant: CHERVON (HK) LIMITED, Wanchai (HK)

(72) Inventors: Li Li, Nanjing (CN); Toshinari Yamaoka, Nanjing (CN); Fangjie Nie, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 114 days.

(21) Appl. No.: 15/048,084

(22) Filed: Feb. 19, 2016

(65) Prior Publication Data

US 2016/0242365 A1    Aug. 25, 2016

(30) Foreign Application Priority Data

Feb. 25, 2015  (CN) .......................... 2015 1 0087825
Feb. 25, 2015  (CN) .......................... 2015 1 0087827
Feb. 25, 2015  (CN) .......................... 2015 2 0115733
Feb. 25, 2015  (CN) .......................... 2015 2 0116225

(51) Int. Cl.
*A01G 3/053* (2006.01)
*F16H 1/02* (2006.01)
*F16D 11/14* (2006.01)
*F16D 11/00* (2006.01)

(52) U.S. Cl.
CPC .............. *A01G 3/053* (2013.01); *F16D 11/14* (2013.01); *F16H 1/02* (2013.01); *F16D 2011/008* (2013.01)

(58) Field of Classification Search
CPC ... A01G 3/053; F16D 11/14; F16D 2011/008; F16H 1/02
See application file for complete search history.

(56) References Cited

U.S. PATENT DOCUMENTS

| 3,431,647 A * | 3/1969 | Scott ....................... A01G 3/053 30/210 |
| 3,625,292 A * | 12/1971 | Lay ......................... A01G 3/062 172/13 |
| 4,653,623 A * | 3/1987 | Demorest ............... F16D 7/048 192/56.1 |
| 5,314,381 A * | 5/1994 | Maurer .................. F16D 43/206 192/56.2 |
| 8,251,826 B2 * | 8/2012 | Lai .......................... F16D 7/048 192/56.1 |
| 2011/0203119 A1 * | 8/2011 | Rosskamp ............. A01G 3/053 30/277.4 |
| 2013/0125538 A1 * | 5/2013 | Frey ........................ F16C 33/02 60/330 |

* cited by examiner

*Primary Examiner* — Stephen Choi
(74) *Attorney, Agent, or Firm* — Greenberg Traurig, LLP

(57) ABSTRACT

A gardening tool includes a motor, a working assembly for performing a function of the gardening tool, and a transmission system for causing the motor to drive the working assembly. The transmission system includes a first clutch member, a movable member that is moveable from a first position to a second position, a bias member for biasing the movable member to the first position, and a second clutch member configured to rotate with the first clutch member when the movable member is biased to the first position and to rotate relative to the first clutch member when the movable member is located at the second position.

9 Claims, 12 Drawing Sheets

GARDENING TOOL AND HEDGE TRIMMER

RELATED APPLICATION INFORMATION

This application claims the benefit of CN 201510087825.6, filed on Feb. 25, 2015, CN 201520116225.3, filed on Feb. 25, 2015, CN 201510087827.5, filed on Feb. 25, 2015,and CN 201520115733.X, filed on Feb. 25, 2015, the disclosures of which are incorporated herein by reference in their entirety.

FIELD OF THE DISCLOSURE

The present disclosure relates generally to gardening tools, and more particularly to hedge trimmers.

BACKGROUND OF THE DISCLOSURE

A gardening tool, such as a hedge trimmer, has at least one blade member that is provided for use in connection with a cutting operation. It is not uncommon for the blade member to become blocked by something hard when a user operates the gardening tool. If the gardening tool uses high power to drive the blade member and the user cannot stop the gardening tool timely, the motor and the transmission device of the gardening tool may experience an overload condition which may cause a decrease in the working life of the gardening tool.

The statements in this section merely provide background information related to the present disclosure and may not constitute prior art.

SUMMARY

In one aspect of the disclosure, a gardening tool includes a motor, a working assembly for performing a function of the gardening tool, and a transmission system for causing the motor to drive the working assembly.

The transmission system preferably includes a first clutch member, a movable member that can move from a first position to a second position, a bias member for biasing the movable member to the first position, and a second clutch member configured to rotate with the first clutch member when the movable member is biased to the first position and to rotate relative to the first clutch member when the movable member locates to the second position.

Particularly, the gardening tool is a hedge trimmer, wherein the motor is an electric motor and the working assembly is a blade member.

In another aspect of the disclosure, the transmission system preferably includes a first clutch member having a plurality of gear teeth, a spring member having a first state and a second state, and a second clutch member for receiving the spring member.

The spring member bends to a first direction and engages with the plurality of gear teeth in the first state so as to couple the first clutch member and the second clutch member for rotation together, and the spring member bends to a second direction and disengages with the plurality of gear teeth in the second state so as to uncouple the second clutch member from the first clutch member.

Further areas of applicability will become apparent from the description provided herein. It should be understood that the description and specific examples are intended for purposes of illustration only and are not intended to limit the scope of the present disclosure.

Figure 1:
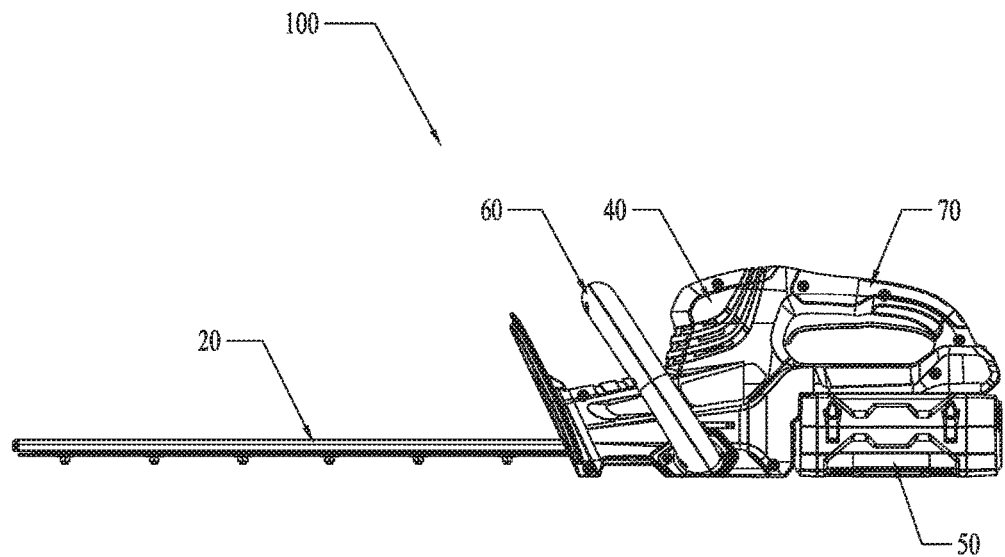
FIG. 1 is a schematic view of an exemplary hedge trimmer.
Figure 2:
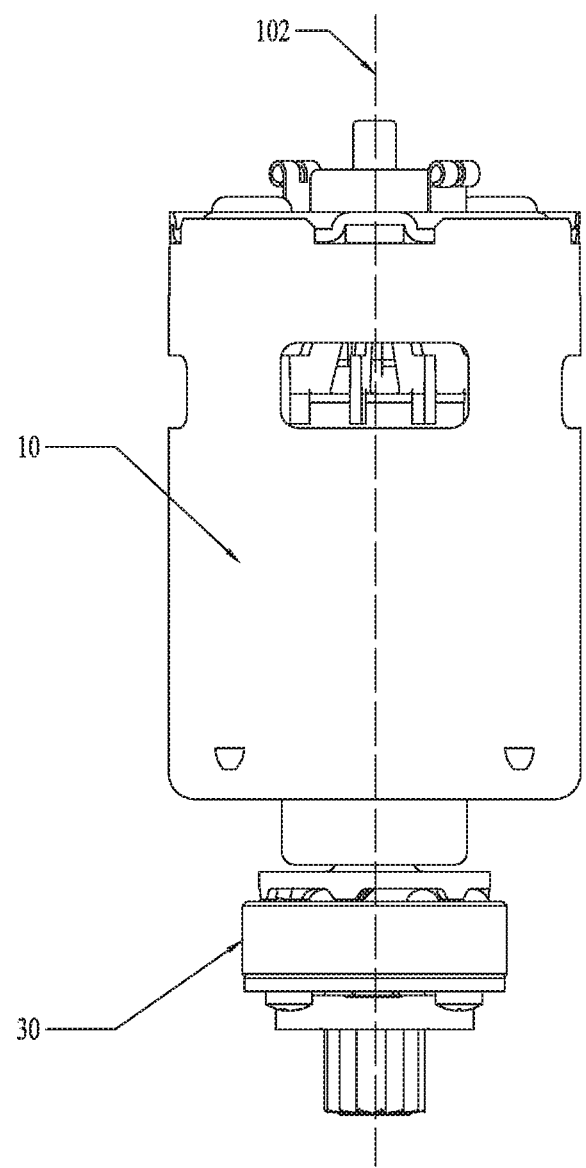
FIG. 2 is a schematic view of a motor and a part of the transmission system of the hedge trimmer.
Figure 3:
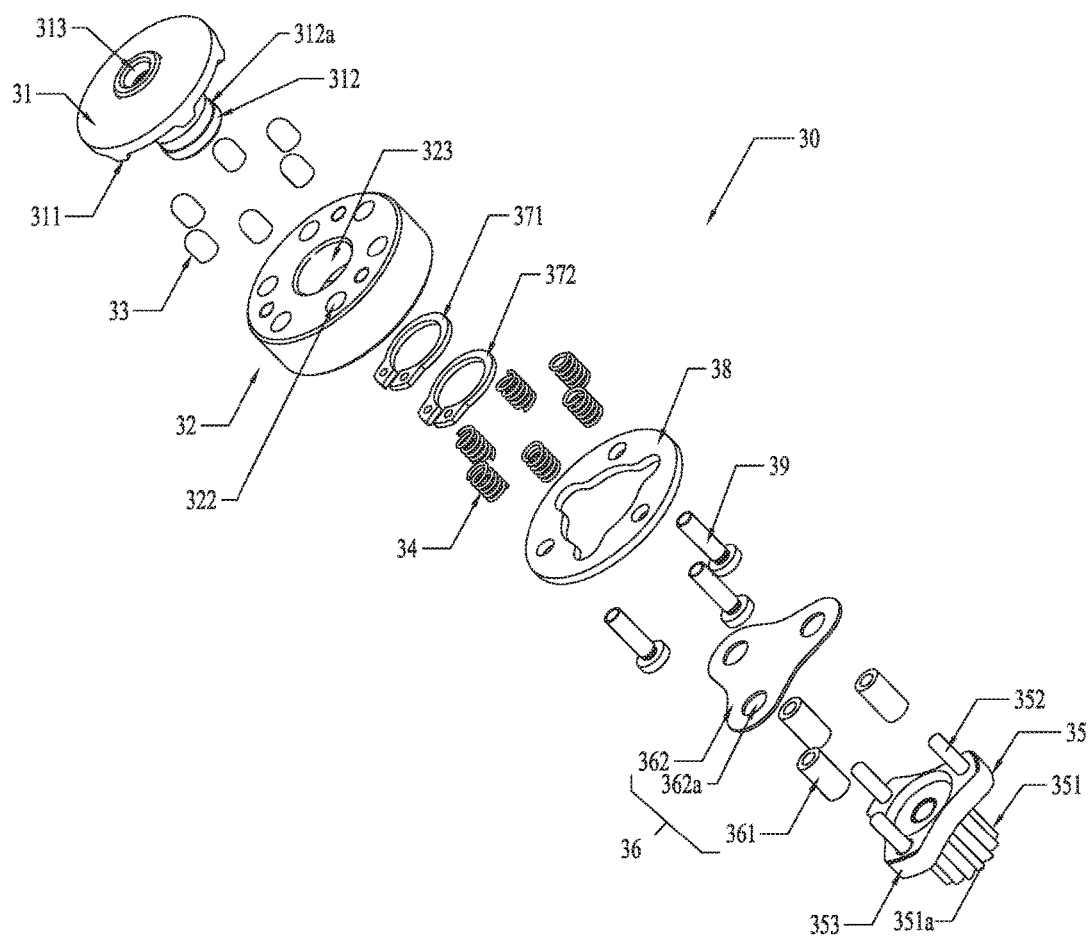
FIG. 3 is an exploded view of the part of the transmission system as shown in FIG. 2.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of preferred embodiments is merely exemplary in nature and is in no way intended to limit the invention hereinafter claimed, its application, or uses.

As shown in FIGS. 1-6, a gardening tool, illustrated in this case as a hedge trimmer 100 by way of example only, mainly includes a motor 10, a working assembly 20, a transmission system 30, a housing 40 and a battery pack 50.

The motor 10 may be an electrically powered or gas/diesel engine powered motor. In this exemplary embodiment the motor 10 is a brushless DC (BLDC) motor.

The working assembly 20 is used to perform a function of the gardening tool. In this exemplary embodiment, the working assembly 20 at least has a blade member for cutting hedges, bushes and the like.

The transmission system 30 is used to cause the motor 10 to drive the working assembly 20 to perform cutting actions.

The housing 40 is used to accommodate the motor 10, the transmission system 30 and other component of the hedge trimmer 100.

The battery pack 50 is at least used to provide power to the motor 10 provided in this example.

The hedge trimmer 100 may further include a first handle 60 and a second handle 70. Users can operate the hedge trimmer 100 by the first handle 60 and the second handle 70. The housing 40 may form the second handle 70, and the first handle may be another accessory apart from the housing 40. The first handle 60 and the second handle 70 may both be formed by the housing 40.

Referring to FIGS. 1-6, the transmission system 30 mainly includes a first clutch member 31, a second clutch member 32, a movable member 33, and a bias member 34.

The first clutch member 31 is driven by the motor 10. The motor 10 has a motor shaft 101 for driving the first clutch member 31 in a direct way or an indirect way. In this embodiment, the first clutch member 31 has a hole 313 and the motor shaft 101 inserts into the hole 313 so as to drive the first clutch member 31 to rotate about an axis 102. The axis 102 is also the center axis of the motor shaft 101.

The movable member 33 can be moved from a first position to a second position and the bias member 34 is used to bias the movable member 33 to the first position.

The second clutch member 32 is adapted to rotate with the first clutch member 31 when the movable member 33 is biased to engage with the first clutch member 31 and to rotate relative to the first clutch member 31 when the movable member 33 moves to a position which causes the movable member 33 and the first clutch member 31 to be disengaged.

The first clutch member 31 forms at least one protruding structure 311 which protrudes long a direction parallel to the axis 102.

The protruding structure 311 is used to engage with the movable member 33 when the movable member 33 is at the first position.

The movable member 33 may consist of a driving pin 331 which has hemispherical end 331*a* for contacting with the first clutch member 31 and for engaging with the protruding structure 311.

Figure 4:
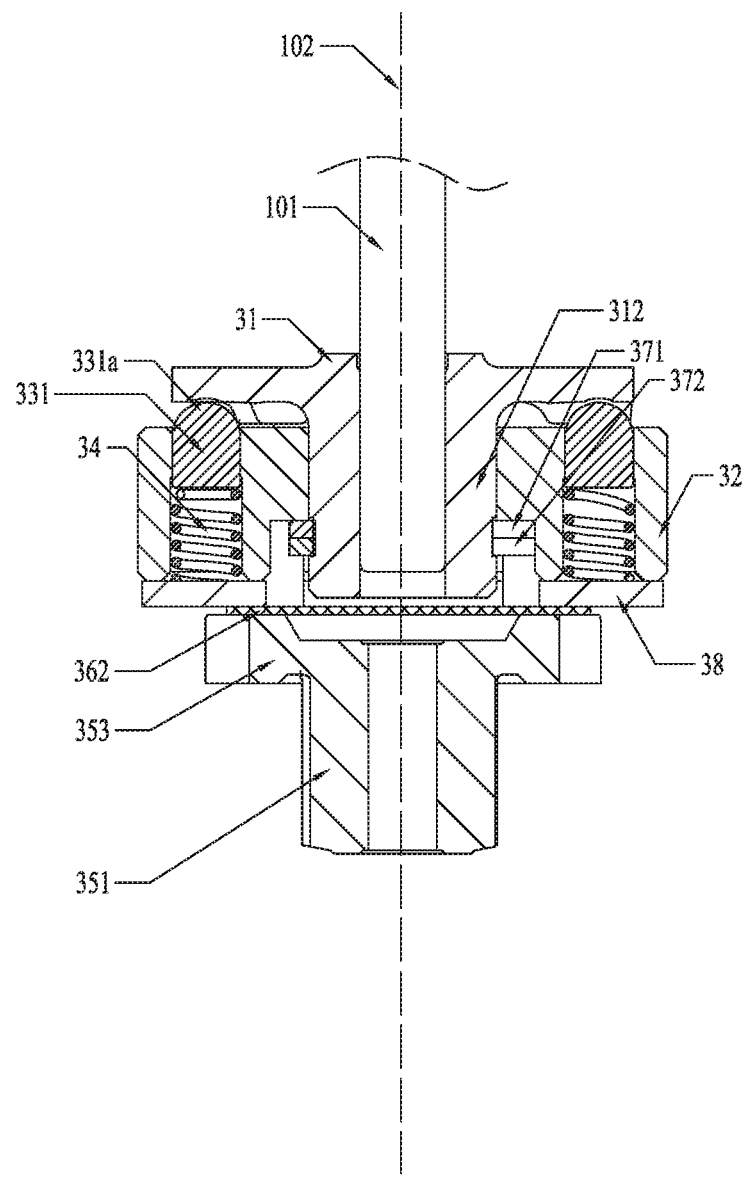
FIG. 4 is a sectional view of the part of the transmission system as shown in FIG. 2.
Figure 5:
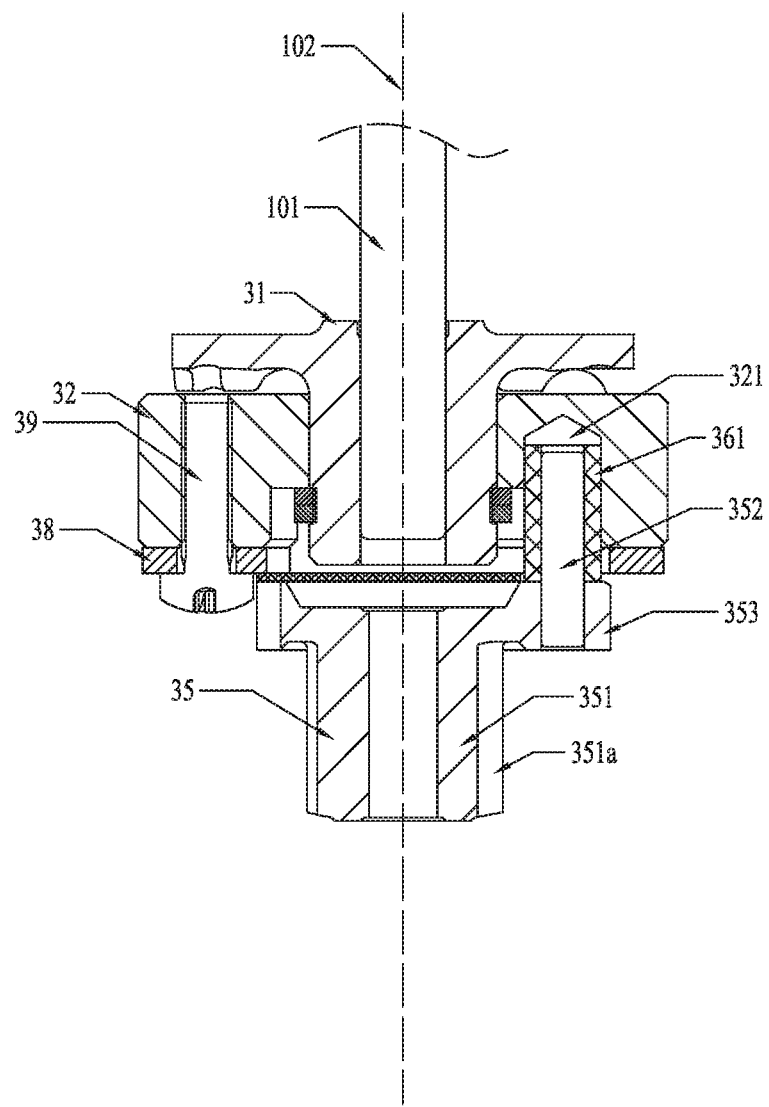
FIG. 5 is another sectional view of the part of the transmission system as shown in FIG. 2.
Figure 6:
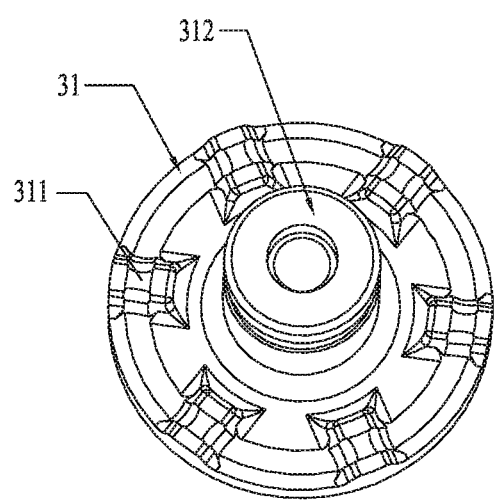
FIG. 6 is a schematic view of the first clutch member of the transmission system.

When the bias member 34 biases the driving pin 331 to the first position (as shown in FIG. 4), the driving pin 331 can transfer a torque from the first clutch member 31 to the second clutch member 32.

When a torque which prevent the second clutch member 32 from rotating is great enough to overcome the frictional force between first clutch member 31 and movable member 33 which is due to the elastic force of the bias member 34, the first clutch member 31 rotates relative to the second clutch member 32, and the driving pin 331 is pressed to draw back from the first position to the second position. Thus, when the transmission system 30 is in an overload condition, the first clutch member 31 and second clutch member 32 disengage so as to protect the transmission system 30.

The transmission system 30 further includes an output member 35 and an insulation assembly 36.

The output member 35 is driven directly or indirectly by the second clutch member 32 and the insulation assembly 36 is used to insulate the output member 35 from the second clutch member 32, especially to prevent a current from passing through the insulation assembly 36.

The output member 35 mainly includes a gear portion 351, a pin portion 352, and a base portion 353. The gear portion 351 forms at least one gear structure 351*a* to output a torque to the rest of transmission system 30. The pin portion 352 is used to couple to the second clutch member 32 so as to cause the second clutch member 32 and the output member 35 to rotate together. The base portion 353 is used to connect the pin portion 352 and the gear portion 351 and is located between the pin portion 352 and the gear portion 351.

The second clutch member 32 forms at least one pin hole 321 for receiving the pin portion 352 and at least one pin chamber 322 for receiving the bias member 34 and at least a part of the driving pin 331.

The driving pin 331 is slidably disposed in the pin chamber 322 and the hemispherical end 331*a* is capable of sticking out from the pin chamber 322.

The number of bias members 34 is greater than 2, and the number of the pin chambers 322 is equal to the number of the bias members 34. The bias member 34 may consist of a helical spring.

The insulation assembly 36 mainly includes an insulation sleeve 361 and an insulation sheet 362. The insulation sleeve 361 is disposed on the pin portion 352 and is used to insulate the pin portion 352 from the hole wall of the pin hole 321. The insulation sheet 362 is disposed between the base portion 353 and the second clutch member 32 and is used to insulate the base portion 353 from the second clutch member 32.

The insulation sheet 362 has at least one hole 362*a*, and the insulation sleeve 361 can pass through the insulation sheet 362*a*.

The insulation assembly 36 can increase the insulating property of the transmission system 30.

The first clutch member 31 further includes a coupling portion 312 for coupling with the second clutch member 32. The second clutch member 32 forms a hole 323, and the coupling portion 312 passes through the hole 323. The coupling portion 312 forms a ring groove 312*a* arranged at the outer peripheral face of the coupling portion 312. The transmission system 30 further includes two C-ring 371,372 to couple at the ring groove 312*a* so as to limit the relative motion of the first clutch member 31 and the second clutch member 32 in the direction parallel to the axis 102.

The transmission system 30 further includes a cap 38 and a fastener 39. The cap 38 is used to block one of two open end of the pin chamber 322, and the fastener 39 is used to fasten the cap 38 to the second clutch member 32.

Figure 7:
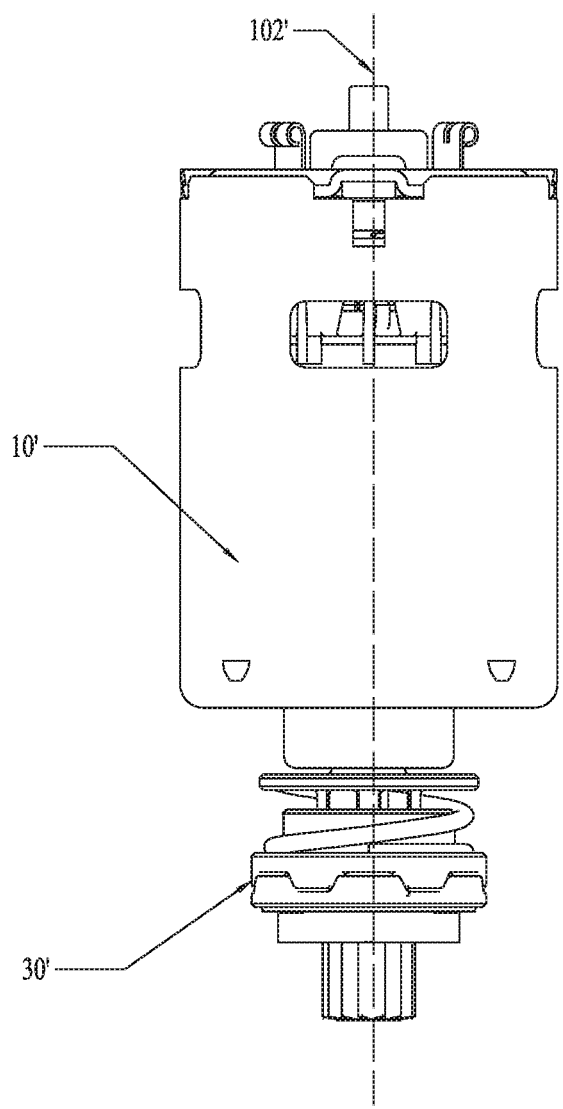
FIG. 7 is a schematic view of another exemplary motor and a part of the transmission system of the hedge trimmer.
Figure 8:
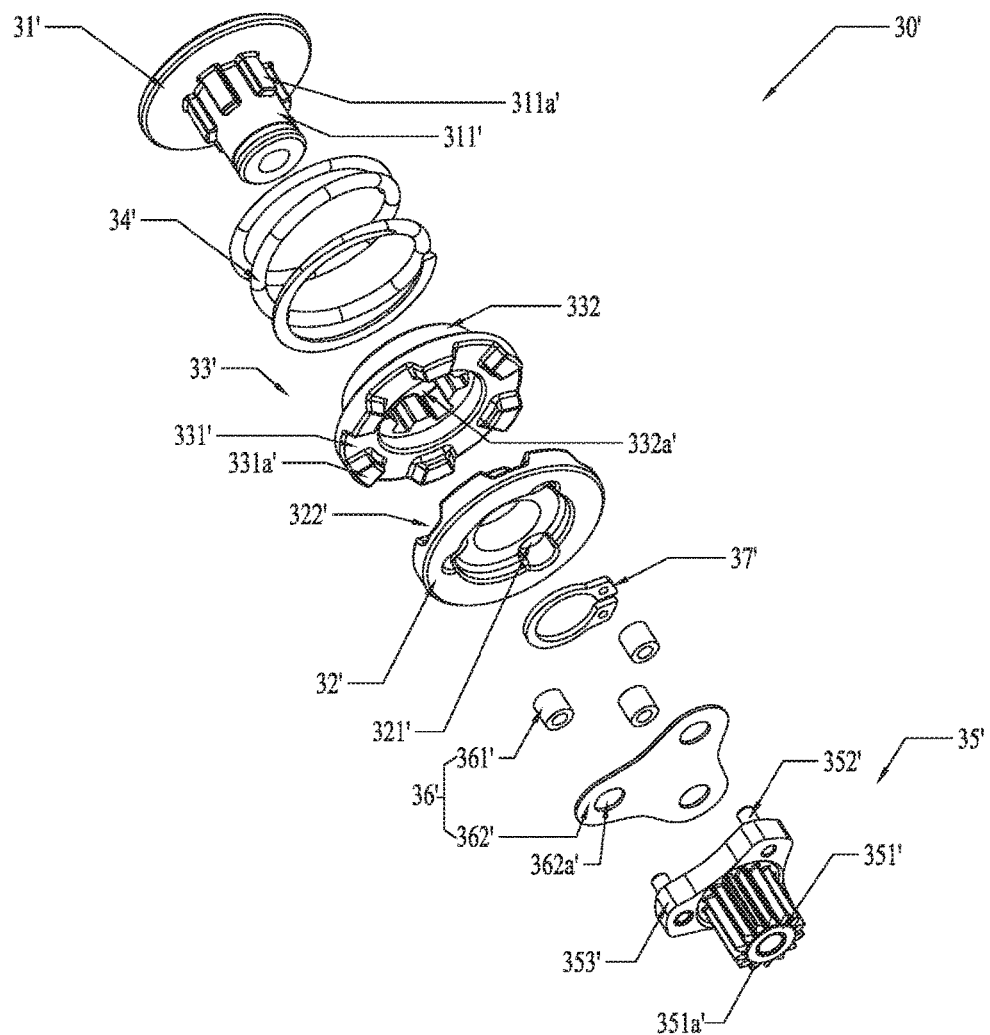
FIG. 8 is an exploded view of the part of the transmission system as shown in FIG. 7.
Figure 9:
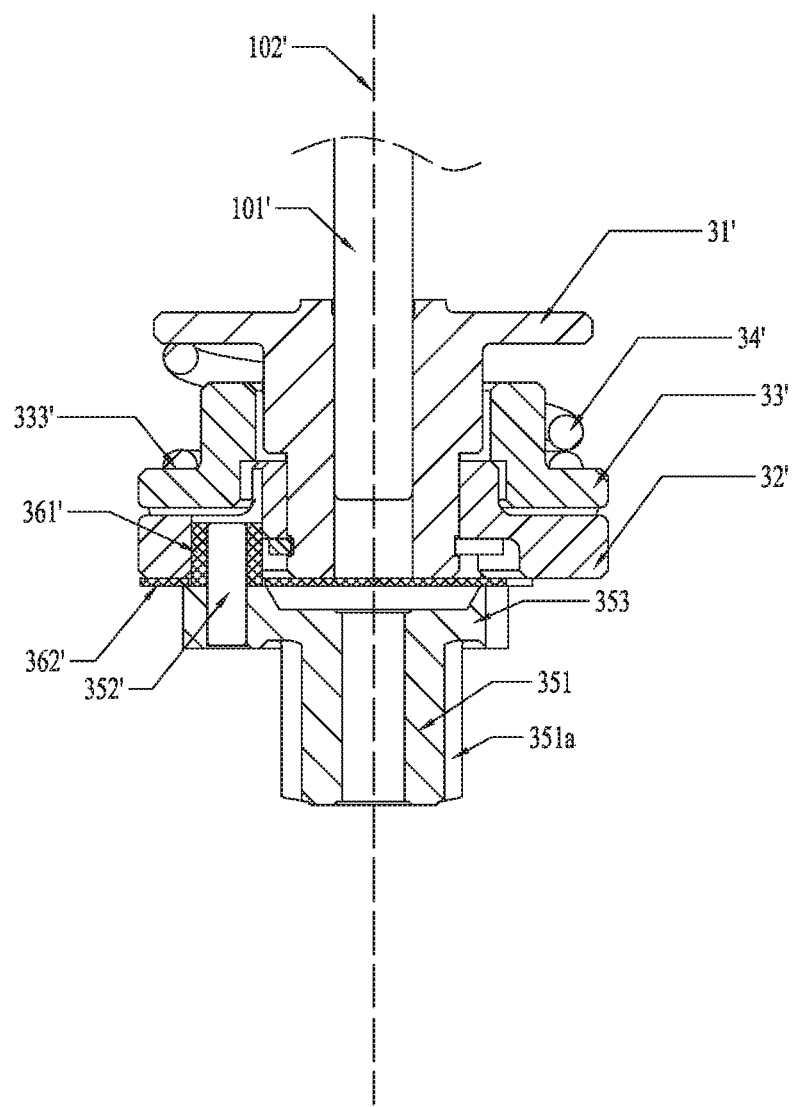
FIG. 9 is a sectional view of the part of the transmission system as shown in FIG. 7.

FIGS. 7-9 illustrate another motor 10' and a transmission system 30' which are adapted for use with gardening tools.

As illustrated, the transmission system 30' mainly includes a first clutch member 31', a second clutch member 32', a movable member 33', a bias member 34' and an output member 35'.

The first clutch member 31' is driven by the motor 10'. The motor 10' has a motor shaft 101' for driving the first clutch member 31' in a direct way or an indirect way. In this embodiment, the first clutch member 31' is connected to the motor shaft 101' so as to drive the first clutch member 31' to rotate about an axis 102'. The axis 102' is also the center axis of the motor shaft 101'.

The first clutch member 31' includes an driving portion 311' which forms at least one spline 311*a'*.

The movable member 33' can move from one position to another position and the bias member 34 is used to bias the movable member 33 to engage with the second clutch member 32'.

The movable member 33' mainly includes an engaging portion 331' and a driven portion 332'. The engaging portion 331' forms at least one clutch tooth 331*a'*, and the driving portion 311' has a splined hole 332*a'*.

The driving portion 311' is disposed into the splined hole 332*a'* so as to cause the first clutch member 31' and the movable member 33' to rotate together. The movable member 33' can slide relatively to the first clutch member 31' along a direction parallel to the axis 102'.

The second clutch member 32' forms a pin hole 321'and at least one tooth groove 322'. The tooth groove 322' is used to engage with the clutch tooth 331*a'* so as to cause the first clutch member 31' and the second clutch member 32' to rotate together.

Similar to the device shown in FIGS. 1-6, when transmission system 30' is in an overload condition, the bias member 34' cannot bias the movable member 33' to engage with the second clutch member 32' so the first clutch member 31' will rotate relative to the second clutch member 32'. The bias member 34' may consist of a helical spring.

The output member 35 is used to be driven directly or indirectly by the second clutch member 32 and the insulation assembly 36 is used to insulate the output member 35 from the second clutch member 32, especially to prevent a current from passing through the insulation assembly 36.

The output member 35' mainly includes a gear portion 351', a pin portion 352', and a base portion 353'. The gear portion 351' forms at least one gear structure 351a' to output a torque to the rest of transmission system 30'. The pin portion 352' is used to couple to the second clutch member 32' so as to cause the second clutch member 32' and the output member 35' to rotate together. The base portion 353' is used to connect the pin portion 352' and the gear portion 351' and is located between the pin portion 352' and the gear portion 351'.

The second clutch member 32' forms at least one pin hole 321' for receiving the pin portion 352'.

The insulation assembly 36' mainly includes an insulation sleeve 361' and an insulation sheet 362'. The insulation sleeve 361' is disposed on the pin portion 352' and is used to insulate the pin portion 352' from the hole wall of the pin hole 321'. The insulation sheet 362' is disposed between the base portion 353' and the second clutch member 32' and is used to insulate the base portion 353' from the second clutch member 32'.

The insulation sheet 362' has at least one hole 362a', and the insulation sleeve 361' can pass through the insulation sheet 362a'.

The insulation assembly 36' can increase the insulating property of the transmission system 30'.

Figure 10:
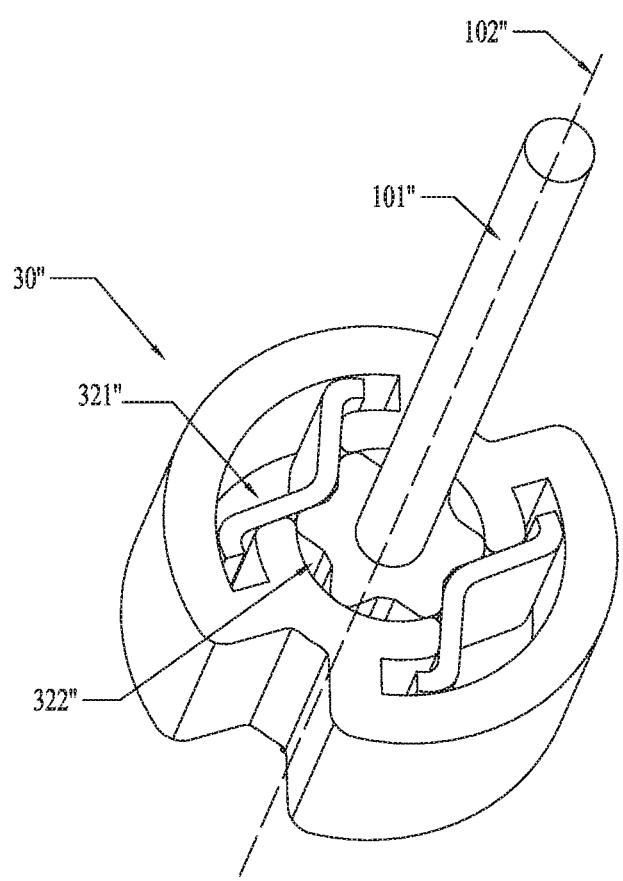
FIG. 10 is a schematic view of another exemplary part of the transmission system.
Figure 11:
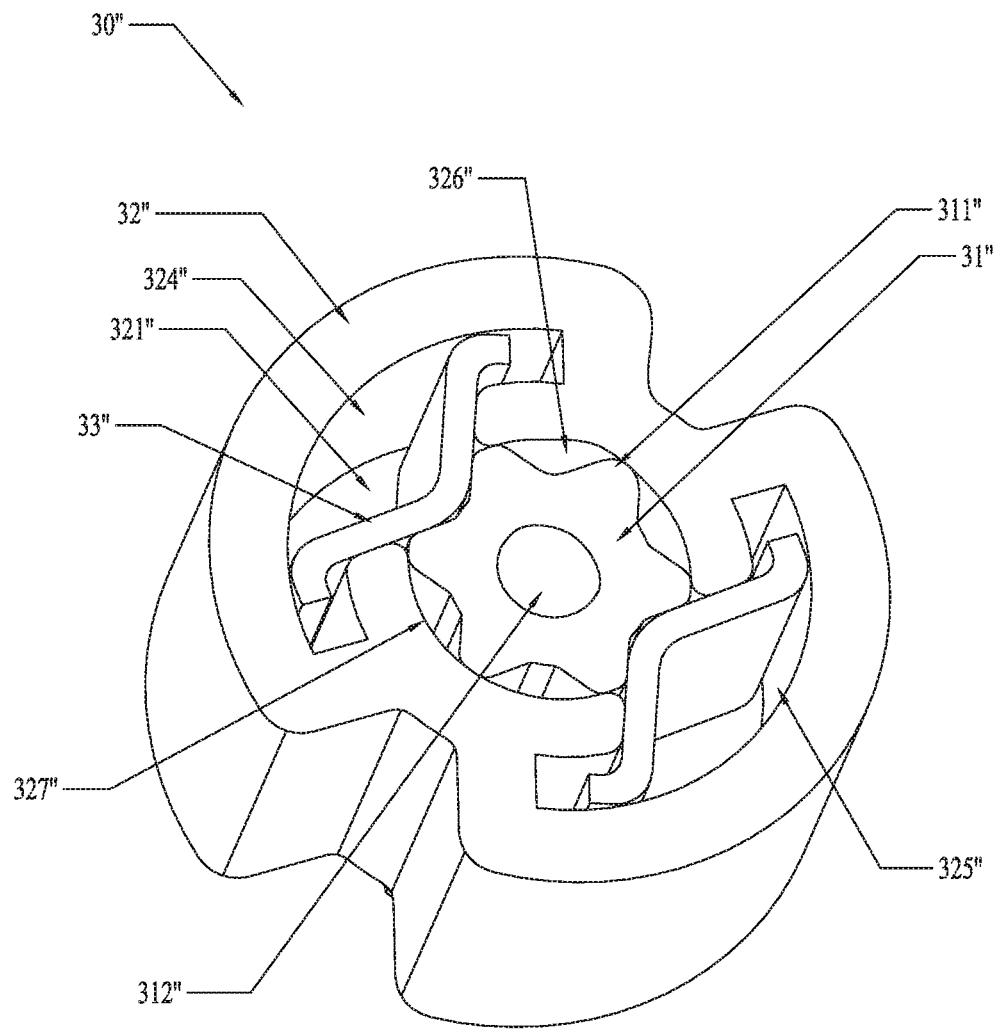
FIG. 11 is a partial schematic view of the transmission system as shown in FIG. 10.
Figure 12:
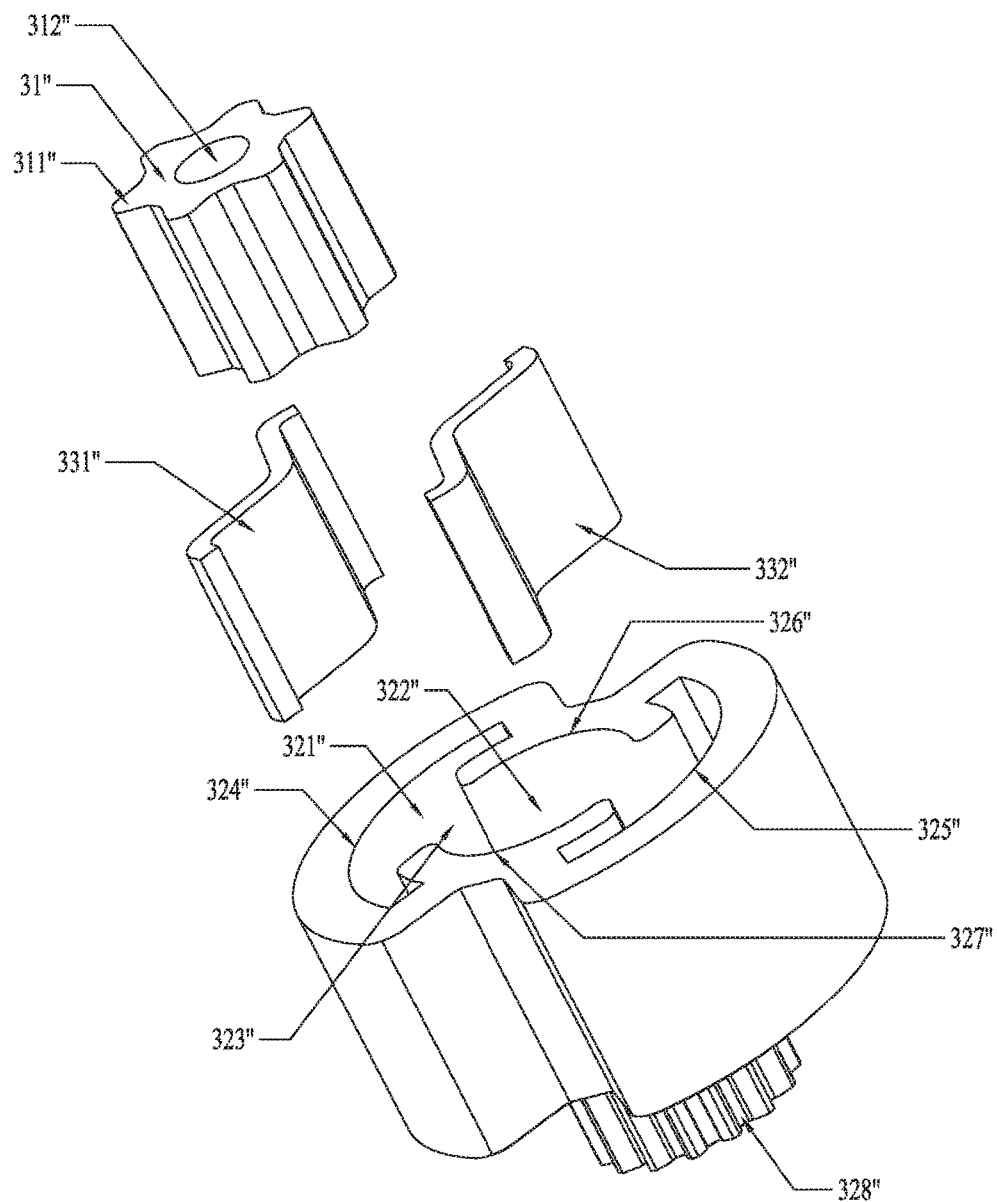
FIG. 12 is an exploded view of the part of the transmission system as shown in FIG. 10.

FIGS. 10-12 illustrate another transmission system 30" which is adapted for use with gardening tools.

As illustrated, the transmission system 30' mainly includes a first clutch member 31', a second clutch member 32', and a spring member 33".

The first clutch member 31" is driven by a motor. The motor has a motor shaft 101" for driving the first clutch member 31" in a direct way'. The first clutch member 31' is connected to the motor shaft 101" so as to drive the first clutch member 31" to rotate about an axis 102". The axis 102" is also the center axis of the motor shaft 101".

The first clutch member 31' forms at least one gear tooth 311" and a hole 312" for receiving the motor shaft 101".

The spring member 33" at least has two different states. The spring member 33" bends to a first direction and engages the gear tooth 311" in one state so as to couple the first clutch member 31" and the second clutch member 32" to rotate together and the spring member 33" bends to another direction and disengages with gear tooth 311" in another state so as to uncouple the second clutch member 32" from the first clutch member 31".

The spring member 33" may consist of a leaf spring that bends to the first clutch member in a force-free state.

The transmission system 30" includes two leaf spring 331",332" that are symmetrically arranged about the axis 102".

The second clutch member 32" defines an outer space 321" for accommodating at least a part of the spring member 33"; a center space 322" for accommodating the first clutch member 31", and a gap 323" that connects the outer space 321" and the center space 322".

A part of the spring member 33" inserts into the center space 322" by passing through the gap 323" in the force-free state.

The s second clutch member 32" comprises an outer wall 324" for forming the outer space 321"; and an inner wall 326" for forming the center space 322". The outer wall 324" is located outside of the inner wall 326" and is configured to support the two ends of the leaf spring 331" when the leaf spring 331" bends to the first clutch member 31".

The outer wall 324" has a circular arc shape and the inner wall 326" has another circular arc shape which has a center that coincides with the center of the outer wall 324"(i.e., they coincide on the axis 102").

The second clutch member 32" may include a gear portion 328" for outputting torque.

When transmission system 30" is in an overload condition, the leaf spring 331" bends in a direction opposite to the direction the leaf spring 331" bends to as shown in FIG. 11.

The second clutch member 32" has two outer wall 324", 325" and two inner wall 326",327", and the two outer wall 324",325" and the two inner wall 326", 327" are symmetrically arranged.

The above illustrates and describes basic principles, main features and advantages of the subject device. Those skilled in the art should appreciate that the examples provided are not intended to limit the invention hereinafter claimed to any particular form. Rather, technical solutions obtained by equivalent substitution or equivalent variations are all intended to fall within the scope of the claimed invention.

What is claimed is:

1. A gardening tool, comprising:
    a motor having a motor shaft;
    a working assembly for performing a function of the gardening tool; and
    a transmission system for causing the motor to drive the working assembly, the transmission system comprising:
        a first clutch member forming a through hole for the motor shaft to pass through;
        a movable member moveable from a first position to a second position;
        a plurality of bias members for biasing the movable member to the first position; and
        a second clutch member configured to rotate with the first clutch member when the movable member is biased to the first position and to rotate relative to the first clutch member when the movable member locates to the second position,
        wherein the first clutch member comprises a circular base and a coupling portion for coupling with the second clutch member, the through hole runs through the circular base and the coupling portion, and the second clutch member forms a second hole for the coupling portion to pass through; and
        wherein the second clutch member comprises pin chambers for accommodating the bias members, and the number of pin chambers is equal to the number of bias members.

2. The gardening tool of claim 1, wherein the transmission system further comprises:
    an output member that is driven by the second clutch member; and
    an insulation assembly for insulating the output member from the second clutch member;
    wherein the insulation assembly is disposed between the output member and the second clutch member.

3. The gardening tool of claim 2, wherein the output member comprises:

a gear portion that forms a gear structure; and a pin portion arranged to couple to the second clutch member;

wherein the second clutch member has a pin hole for receiving the pin portion.

4. The gardening tool of claim 3, wherein the insulation assembly comprises an insulation sleeve disposed on the pin portion and received in the pin hole; the insulation sleeve insulating the pin portion from a hole wall of the pin hole.

5. The gardening tool of claim 3, wherein the output member further comprises a base portion located between the gear portion and the pin portion, and the insulation assembly further comprises an insulation sheet disposed between the base portion and the second clutch member to insulate the base portion from the second clutch member.

6. The gardening tool of claim 1, wherein the first clutch member comprises a protruding structure that engages with the movable member when the movable member is biased to the first position by the bias member.

7. The gardening tool of claim 6, wherein the movable member comprises a driving pin that has a hemispherical end for contacting with the first clutch member.

8. The gardening tool of claim 7, wherein at least a part of the driving pin and the driving pin is slidably disposed in the pin chamber and the hemispherical end extends from the pin chamber.

9. A hedge trimmer, comprising:

a motor;

a blade member for performing a cutting operation; and a transmission system for causing the motor to drive the blade member, the transmission system comprising:

a first clutch member;

a movable member moveable from a first position to a second position;

at least two bias members for biasing the movable member to the first position; and a second clutch member configured to rotate with the first clutch member when the movable member is biased to the first position and to rotate relative to the first clutch member when the movable member is located at the second position, wherein the first clutch member comprises a circular base and a coupling portion for coupling with the second clutch member, the through hole runs through the circular base and the coupling portion, and the second clutch member forms a second hole for the coupling portion to pass through; and wherein the second clutch member comprises pin chambers for accommodating the bias members, and the number of pin chambers is equal to the number of bias members.

* * * * *